(12) United States Patent
Yang et al.

(10) Patent No.: US 11,549,055 B2
(45) Date of Patent: Jan. 10, 2023

(54) WAVELENGTH CONVERTING DEVICE

(71) Applicant: DELTA ELECTRONICS, INC., Taoyuan (TW)

(72) Inventors: Li-Cheng Yang, Taoyuan (TW); Jih-Chi Li, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 398 days.

(21) Appl. No.: 16/924,156

(22) Filed: Jul. 8, 2020

(65) Prior Publication Data
US 2021/0301198 A1   Sep. 30, 2021

(30) Foreign Application Priority Data
Mar. 24, 2020   (CN) .......................... 202010211132.4

(51) Int. Cl.
| | | |
|---|---|---|
| C09K 11/02 | (2006.01) | |
| C08K 3/36 | (2006.01) | |
| C08K 3/22 | (2006.01) | |
| C08K 3/38 | (2006.01) | |
| G03B 21/20 | (2006.01) | |
| G02B 26/00 | (2006.01) | |
| C08G 77/04 | (2006.01) | |
| C08G 77/00 | (2006.01) | |

(52) U.S. Cl.
CPC .............. *C09K 11/02* (2013.01); *C08G 77/04* (2013.01); *C08K 3/22* (2013.01); *C08K 3/36* (2013.01); *C08K 3/38* (2013.01); *G02B 26/008* (2013.01); *G03B 21/204* (2013.01); *G03B 21/208* (2013.01); *G03B 21/2066* (2013.01); *C08G 77/70* (2013.01); *C08G 77/80* (2013.01); *C08K 2003/2227* (2013.01); *C08K 2003/2241* (2013.01); *C08K 2003/2244* (2013.01); *C08K 2003/2296* (2013.01); *C08K 2003/385* (2013.01)

(58) Field of Classification Search
CPC .......... C09K 11/02; C08G 77/04; C08K 3/22; C08K 3/36; C08K 3/38; C08K 2003/385
See application file for complete search history.

(56) References Cited

U.S. PATENT DOCUMENTS

| | | | |
|---|---|---|---|
| 2006/0170332 A1* | 8/2006 | Tamaki | C09K 11/0811 313/503 |
| 2013/0131265 A1 | 5/2013 | Inoue et al. | |
| 2016/0185918 A1 | 6/2016 | Hinzmann et al. | |

FOREIGN PATENT DOCUMENTS

| | | |
|---|---|---|
| CN | 103003367 A | 3/2013 |
| CN | 104595852 A | 5/2015 |
| CN | 109643747 A | 4/2019 |
| TW | 201823421 A | 7/2018 |

* cited by examiner

*Primary Examiner* — Edward J Cain
(74) *Attorney, Agent, or Firm* — CKC & Partners Co., LLC

(57) ABSTRACT

A wavelength converting includes a diffused-reflecting layer, a substrate, a photoluminescence layer, and a binder. The diffused-reflecting layer has a first surface and a second surface facing away from each other. The substrate is over the first surface of the diffused-reflecting layer. The photoluminescence layer is over the second surface of the diffused-reflecting layer. The binder is mixed at least in the photoluminescence layer or at least in the diffused-reflecting layer, the binder includes a structural unit represented by formula (1), and a characteristic absorption band in a Fourier-Transform Infrared (FTIR) Spectrum of silicon-oxygen-silicon bonds (Si—O—Si bonds) in the binder is from 900 $cm^{-1}$ to 1250 $cm^{-1}$,

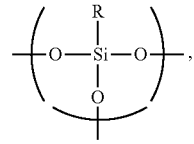

formula (1)

in which R represents an aromatic group.

9 Claims, 6 Drawing Sheets

WAVELENGTH CONVERTING DEVICE

RELATED APPLICATIONS

This application claims priority to China Application Serial Number 202010211132.4, filed Mar. 24, 2020, which is herein incorporated by reference.

BACKGROUND

Field of Invention

The present invention relates to a wavelength converting device.

Description of Related Art

In recent years, optical projectors have been widely used in many fields and in various places, such as schools, homes, and businesses.

In one kind of the projectors, a laser light source provides first light incident on a fluorescence material to emit second light. In this regard, the fluorescence material and a reflective material is coated on a wheel, and the wheel is driven to rotate at a high speed by a motor. An image is finally formed by light reflecting from the wheel. With an increasing demand for the brightness of the optical projectors, how to make the fluorescent material and the reflective material exert a better effect has become an important issue in the present.

SUMMARY

According to some aspects of the present disclosure, a wavelength converting device is provided, which includes a diffused-reflecting layer, a substrate, a photoluminescence layer, and a binder. The diffused-reflecting layer has a first surface and a second surface facing away from each other. The substrate is over the first surface of the diffused-reflecting layer. The photoluminescence layer is over the second surface of the diffused-reflecting layer. The binder is mixed at least in the photoluminescence layer or at least in the diffused-reflecting layer, the binder includes a structural unit represented by formula (1), and a characteristic absorption band in a Fourier-Transform Infrared (FTIR) Spectrum of silicon-oxygen-silicon bonds (Si—O—Si bonds) in the binder is from 900 cm$^{-1}$ to 1250 cm$^{-1}$,

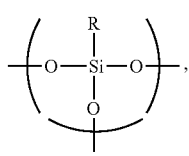

formula (1)

in which R represents an aromatic group.

In some embodiments of the present disclosure, the binder is mixed in the photoluminescence layer and the diffused-reflecting layer.

In some embodiments of the present disclosure, the binder is mixed in the photoluminescence layer, and a viscosity of the photoluminescence layer comprising the binder at a temperature of 25° C. is between 200 mPa·s and 20000 mPa·s.

In some embodiments of the present disclosure, the binder is mixed in the diffused-reflecting layer, and a viscosity of the photoluminescence layer comprising the binder at a temperature of 25° C. is between 200 mPa·s and 20000 mPa·s.

In some embodiments of the present disclosure, a viscosity of the binder at a temperature of 25° C. is smaller than 300 mPa·s.

In some embodiments of the present disclosure, the binder is mixed in the photoluminescence layer, and a thickness of the photoluminescence layer comprising the binder is between 50 μm to 200 μm.

In some embodiments of the present disclosure, the binder is mixed in the diffused-reflecting layer, and a thickness of the diffused-reflecting layer comprising the binder is between 30 μm to 150 μm.

In some embodiments of the present disclosure, the diffused-reflecting layer comprises a plurality of optical particles, and the optical particles comprise silicon dioxide, titanium dioxide, zinc oxide, boron nitride, zirconium dioxide, aluminum oxide, or combinations thereof.

In some embodiments of the present disclosure, the photoluminescence layer comprises the optical particles.

According to the aforementioned embodiments of the present disclosure, since the binder of the wavelength converting device includes the structural unit represented by the above formula (1), and the characteristic absorption peaks in the Fourier-Transform Infrared Spectrum of silicon-oxygen-silicon bonds in the binder are from 900 cm$^{-1}$ to 1250 cm$^{-1}$, the diffused-reflecting layer and/or the photoluminescence layer mixed with the binder can have good optical resistance properties and heat resistance properties. In addition, since the binder includes a bulky aromatic group, the diffused-reflecting layer and/or the photoluminescence layer mixed with the binder can have a certain thickness to improve the overall optical quality of the wavelength converting device.

DETAILED DESCRIPTION

Figure 1:
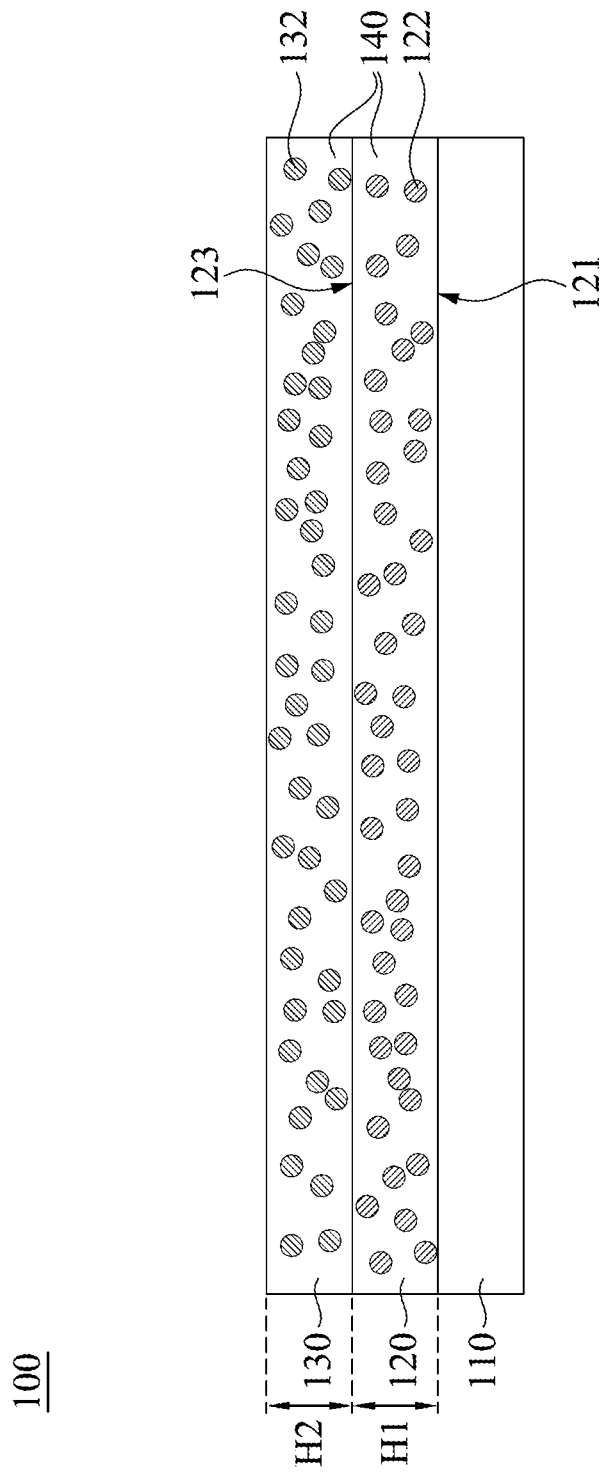
FIG. 1 illustrates a cross-sectional schematic view of a wavelength converting device.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a cross-sectional schematic view of a wavelength converting device 100. The wavelength converting device 100 includes a substrate 110, a diffused-reflecting layer 120, and a photoluminescence layer 130. The diffused-reflecting layer 120 has a first surface 121 and a second surface 123 facing away from each other. The substrate 110 is on the first surface 121 of the diffused-reflecting layer 120. The photoluminescence layer 130 is on the second surface 123 of the diffused-reflecting layer 120. Stated differently, the substrate 110 is configured to carry the diffused-reflecting layer 120 and the photoluminescence layer 130. In some embodiments, the wavelength converting device 100 is a reflective fluorescent phosphor wheel, which generates excitation light by absorption of a light beam (e.g., laser light). In detail, the light beam is absorbed by the photoluminescence layer 130 to generate the excitation light, which is further diffusely reflected in and by the diffused-reflecting layer 120 and then emitted out of the wavelength converting device 100 for imaging. In some embodiments, the wavelength converting device 100 is connected to a motor through a driving shaft, such that the wavelength converting device 100 can be rotated when the motor drives the driving shaft to rotate.

In some embodiments, the substrate 110 may be, for example, a sapphire substrate, a glass substrate, a borosilicate glass substrate, a floating boron-silicate glass substrate, a fused quartz substrate or a calcium fluoride substrate, a ceramic substrate, an aluminum substrate, or combinations thereof. However, the materials included in the substrate 110 are not limited thereto, and the materials included in the substrate 110 can be adjusted according to actual needs. In some embodiments, the diffused-reflecting layer 120 includes a plurality of optical particles 122 configured to diffusely reflect the excitation light excited by the photoluminescence layer 130. In other embodiments, the diffused-reflecting layer 120 and the photoluminescence layer 130 both include a plurality of optical particles 122 to enhance the diffused reflection of the excitation light. The optical particles 122 include silicon dioxide ($SiO_2$), titanium dioxide ($TiO_2$), zinc oxide (ZnO), boron nitride (BN), zirconium dioxide ($ZrO_2$), aluminum oxide ($Al_2O_3$), or combinations thereof. In some embodiments, the photoluminescence layer 130 may include phosphor 132, such as silicate phosphor; nitride phosphor; $Y_3Al_5O_{12}$ (YAG), $Tb_3Al_5O_{12}$ (TAG), or $Lu_3Al_5O_{12}$ (LuAG) phosphor with garnet structures; or combinations thereof.

In some embodiments, the wavelength converting device 100 includes a binder 140. The binder 140 may be mixed in the diffused-reflecting layer 120 and/or the photoluminescence layer 130. In detail, the binder 140 mixed in the diffused-reflecting layer 120 can fix the optical particles 122 to the substrate 110, and the binder 140 mixed in the photoluminescence layer 130 can fix the phosphor 132 (and the optical particles 122) to the substrate 110. In addition, the bonder 140 can protect the optical particles 122 in the diffused-reflecting layer 120 and the phosphor 132 (and the optical particles 122) in the photoluminescence layer 130, and can prevent precipitation of the optical particles 122 and the phosphor 132, thereby improving the overall optical quality of the wavelength converting device 100.

In some embodiments, the binder 140 includes a resin material and a solvent, and the resin material includes a structural unit represented by the following formula (1). As shown in formula (1), the resin material includes a main chain formed by Si—O—Si bonds. It should be noted that the resin material in a conventional binder often includes a main chain formed by silicon-carbon-silicon bonds (Si—C—Si bonds) or silicon-carbon-carbon-silicon bonds (Si—C—C—Si bonds), and since an average bond energy of the Si—O—Si bonds is greater than an average bond energy of the Si—C—Si bonds and an average bond energy of the Si—C—C—Si bonds, the binder 140 of the present disclosure can have better optical resistance properties and heat resistance properties comparing to the conventional binder,

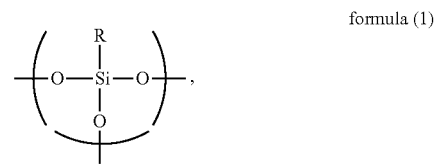

formula (1)

in which R represents an aromatic group.

In some embodiments, the characteristic absorption peaks of the Si—O—Si bonds in the resin material of the binder 140 in a Fourier-Transform Infrared (FTIR) spectrum are in a range from about 900 $cm^{-1}$ to about 1250 $cm^{-1}$. In other words, the characteristic absorption bandwidth of the Si—O—Si bonds in the resin material of the binder 140 in the Fourier-Transform Infrared (FTIR) spectrum is about 350 $cm^{-1}$. Accordingly, silicon atoms and oxygen atoms in the resin material of the binder 140 have a great degree of network-crosslinking, so as to further improve the optical resistance properties and heat resistance properties of the binder 140. As such, when the binder 140 is mixed in the diffused-reflecting layer 120 and the photoluminescence layer 130, material degradation of the diffused-reflecting layer 120 and the photoluminescence layer 130 due to light beam irradiation can be prevented, and thus the overall optical quality of the wavelength converting device 100 can be improved. In addition, the degree of network-crosslinking between the silicon atoms and the oxygen atoms in the resin material can be improved through the concentration of the resin material. In some embodiments, based on a total weight of the binder 140, a content of the resin material is between 50 wt. % and 90 wt. %, and preferably between 65 wt. % and 75 wt. %.

In some embodiments, the aromatic group in the resin material may include benzene, toluene, phenol, aniline, benzoic acid, benzaldehyde, biphenyl, ortho-xylene, meta-xylene, para-xylene, indene, naphthalene, anthracene, phenanthrene, other suitable units, or combinations thereof. In other words, in the resin material of the binder 140, a bond is formed between a silicon atom of the main chain and a carbon atom of the aromatic group. Since silicon-carbon bonds (Si—C bonds) can give the resin material of the binder 140 a better elasticity comparing to simple silicon-oxygen bonds (Si—O bonds), the diffused-reflecting layer 120 and the photoluminescence layer 130 can have better tenacity, so as to prevent cracks due to brittle and hard structures.

Since the aromatic group is a bulky functional group, the binder 140 can have a certain thickness, such that the diffused-reflecting layer 120 mixed with the binder 140 and the electroluminescent layers 130 mixed with the binder 140 can respectively have certain thicknesses. As such, the diffused-reflecting layer 120 and the photoluminescence layer 130 can respectively include more optical particles 122 and phosphor 132 to achieve good optical effects. In some embodiments, a thickness H1 of the diffused-reflecting layer 120 mixed with the binder 140 is between 30 μm and 150 μm, and preferably between 50 μm and 100 μm. In some embodiments, a thickness H2 of the photoluminescence layer 130 mixed with the binder 140 is between 50 μm and 200 μm, and preferably between 100 μm and 150 μm.

In some embodiments, dealcoholization condensation reaction and dehydration condensation reaction may be sequentially performed to form the binder 140 of the present disclosure. In detail, a silicon compound monomer including an alkoxy group may first be provided to undergo the dealcoholization condensation reaction with a water molecule to obtain a hydroxyl-containing silicon compound monomer. A plurality of hydroxyl-containing silicon compound monomers may then be provided to undergo the dehydration condensation reaction. Through the aforementioned process, the silicon atoms and the oxygen atoms in the multiple hydroxyl-containing silicon compound monomers can undergo a network-crosslinking reaction to form the binder 140 of the present disclosure. Since the aforementioned dealcoholization and dehydration condensation reactions are single storage reactions, that is, reactions that can be completed using one reactant monomer, the convenience of the manufacturing process can be improved and the cost of the manufacturing process can be effectively reduced.

In some embodiments, the binder 140 may be mixed with the optical particles 122 to form the diffused-reflecting layer 120, and the binder 140 may be mixed with the phosphor 132 (and the optical particles 122) to form the photoluminescence layer 130. After that, the diffused-reflecting layer 120 mixed with the binder 140 and the photoluminescence layer 130 mixed with the binder 140 are sequentially coated on substrate 110 by using a blade coating method. The blade coating method can save an amount of the binder 140 to avoid excessive consumption of the binder 140. In some embodiments, a viscosity of each of the diffused-reflecting layer 120 mixed with the binder 140 and the photoluminescence layer 130 mixed with the binder 140 can be adjusted to achieve a better effect of blade coating. For example, the viscosity of the diffused-reflecting layer 120 mixed with the binder 140 at a temperature of 25° C. is between 200 mPa·s and 20000 mPa·s, and the viscosity of the photoluminescence layer 130 mixed with the binder 140 at a temperature of 25° C. is between 200 mPa·s and 20000 mPa·s.

In other embodiments, the binder 140 may be formed on the substrate 110 by using a spraying method to be further mixed with the optical particles 122 and the phosphor 132 to respectively form the diffused-reflecting layer 120 and the photoluminescence layer 130. The spraying method can improve a thickness uniformity and a flatness of the entire wavelength converting device 100. In some embodiments, a viscosity of the binder 140 can be adjusted to achieve a better effect of spraying. For example, the viscosity of the binder 140 at a temperature of 25° C. is smaller than 300 mPa·s. Stated differently, by adjusting each of the viscosities of the binder 140, the diffused-reflecting layer 120 mixed with the binder 140, and the photoluminescence layer 130 mixed with the binder 140, the manufacturing method of the wavelength converting device 100 can be more diverse to meet a variety of manufacturing needs.

Hereinafter, the features of the present disclosure will be described more specifically with reference to the binder of this embodiment and the binder of a comparative embodiment. It should be noted that without exceeding the scope of the present disclosure, the materials used, quality and ratio, processing details, and processing procedures may be changed as appropriate. Therefore, the present disclosure should not be interpreted restrictively by the binder of this embodiment described below.

The Binder of this Embodiment

The binder of this embodiment includes a structural unit represented by the following formula (2),

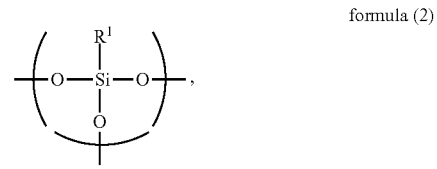

in which $R^1$ represents a benzene group.

The Binder of the Comparative Embodiment

The binder of the Comparative Embodiment includes a structural unit represented by the following formula (3),

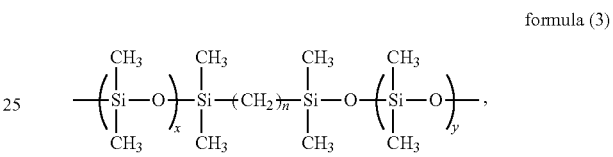

in which x>n and y>n.

Figure 2:
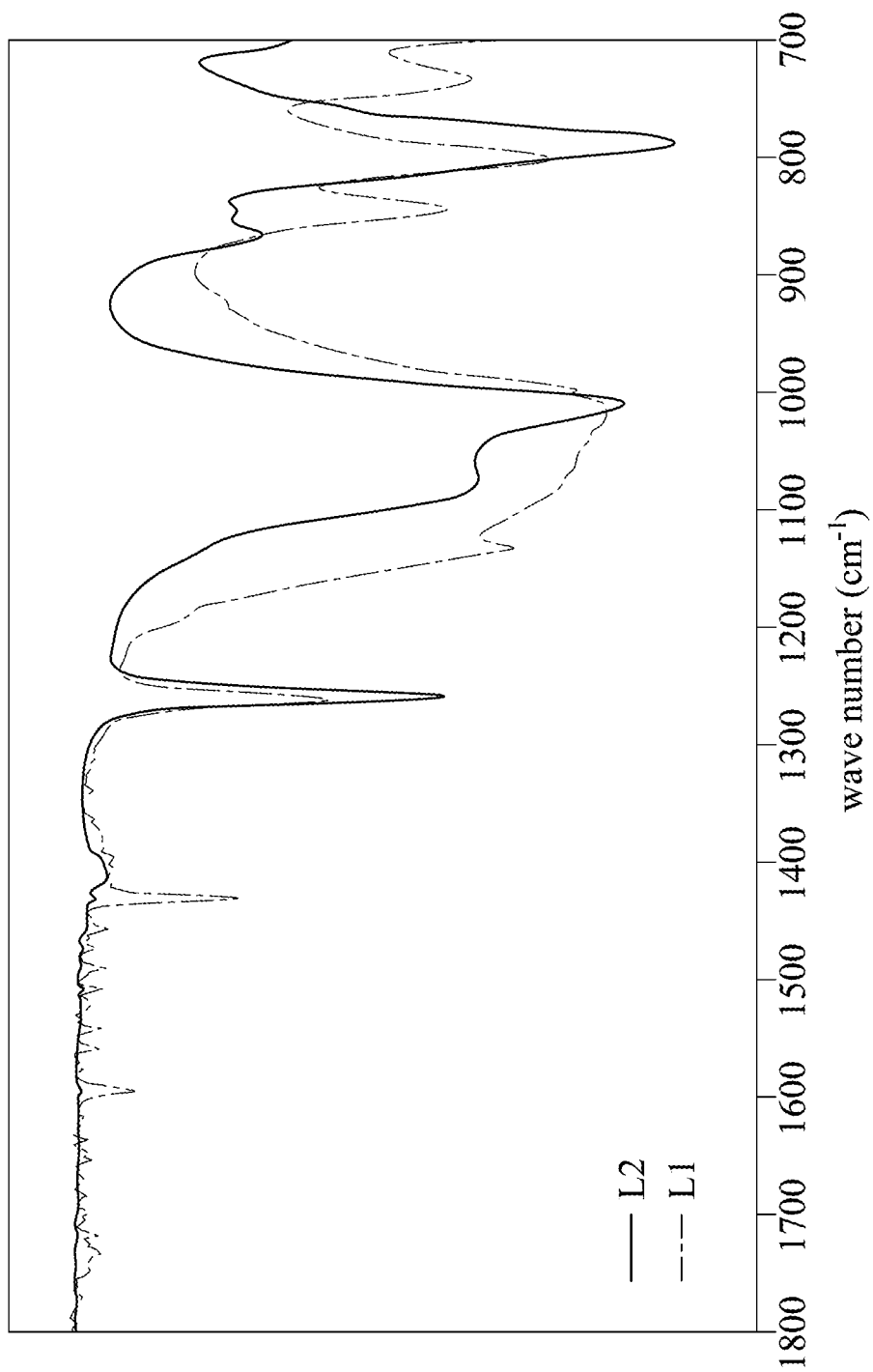
FIG. 2 illustrates Fourier-Transform Infrared spectra of the binder of this embodiment and the binder of the comparative embodiment.

FIG. 2 illustrates Fourier-Transform Infrared spectra of the binder of this embodiment and the binder of the comparative embodiment. In FIG. 2, curve L1 is an absorption curve of the binder of this embodiment, and curve L2 is an absorption curve of the binder of the comparative embodiment. It is pointed out in literature that the characteristic absorption peaks of the Si—O—Si bonds are in a range from about 1000 cm$^{-1}$ to about 1130 cm$^{-1}$, and it can also be seen in FIG. 2 that each of the curve L1 and the curve L2 has characteristic absorption peaks of Si—O—Si bonds in a range from about 1000 cm$^{-1}$ to about 1130 cm$^{-1}$. When comparing the characteristic absorption bandwidth from about 900 cm$^{-1}$ to about 1250 cm$^{-1}$, since the Si—O—Si bonds in the binder of this embodiment has a larger characteristic absorption bandwidth and a more complicated characteristic absorption curve, the binder of this embodiment has a higher degree of network-crosslinking (e.g., having a longer main chain or more branches) than the binder of the comparative embodiment, such that the binder of this embodiment can have better optical resistance properties and heat resistance properties. That is, the binder of this embodiment can form a polymer by the structural unit represented by formula (2) with Si—O—Si bonds, in which the structural units can be network-crosslinked with each other, and the degree of network-crosslinking is good; the binder of the comparative embodiment includes the x-part and the y-part of the main chain composed of Si—O—Si bonds, but the network-crosslinking between the x part and the y part needs to be formed by the Si—C—Si bonds, and the degree of network-crosslinking is poorer than the binder of this embodiment. Since the binder of this embodiment can indeed achieve a better degree of network-crosslinking, the binder of this embodiment can have better optical resistance properties and heat resistance properties.

Figure 3:
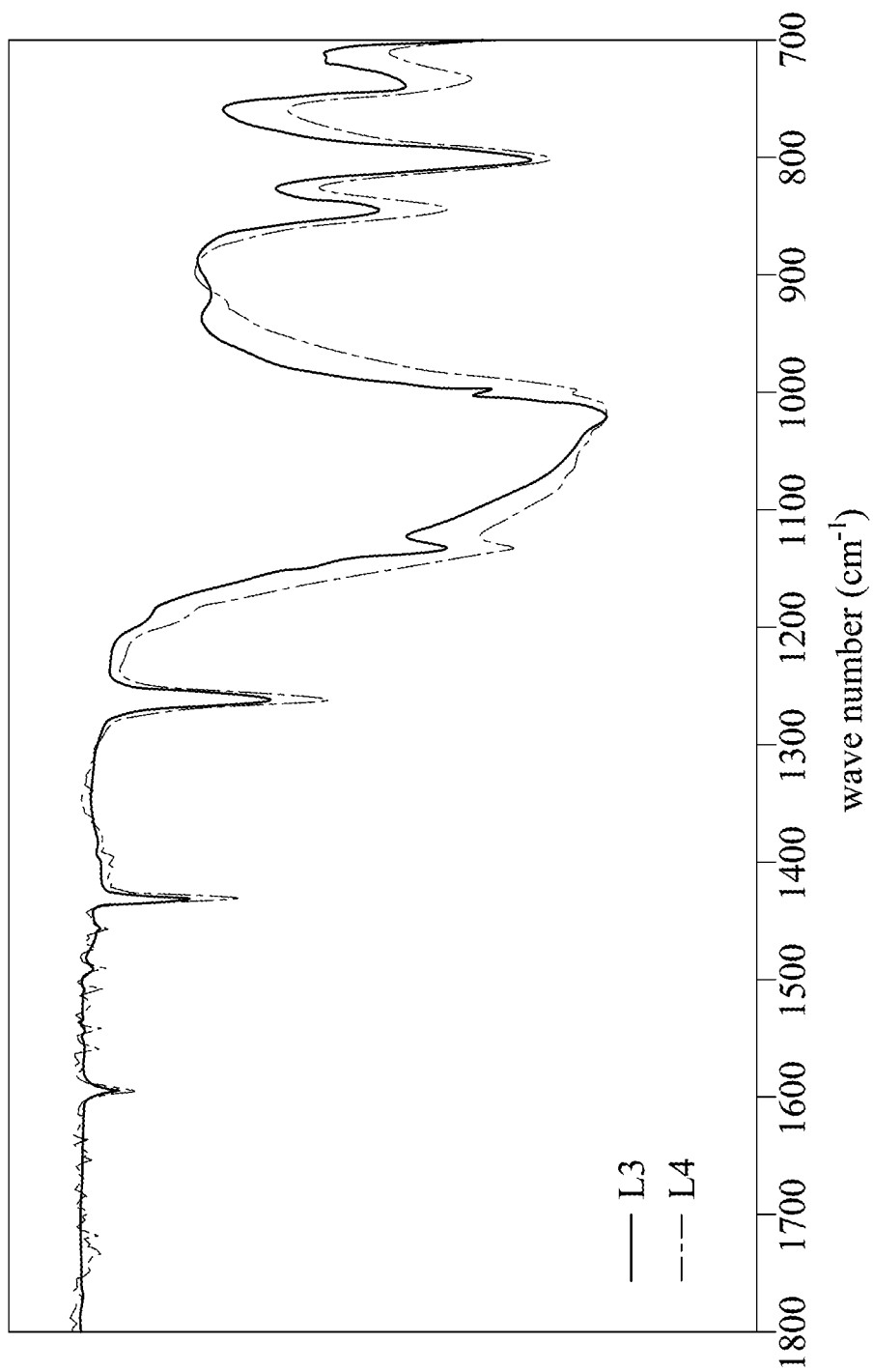
FIG. 3 illustrates Fourier-Transform Infrared spectra of the binder of this embodiment before a reaction and the binder of this embodiment after a reaction.
Figure 4:
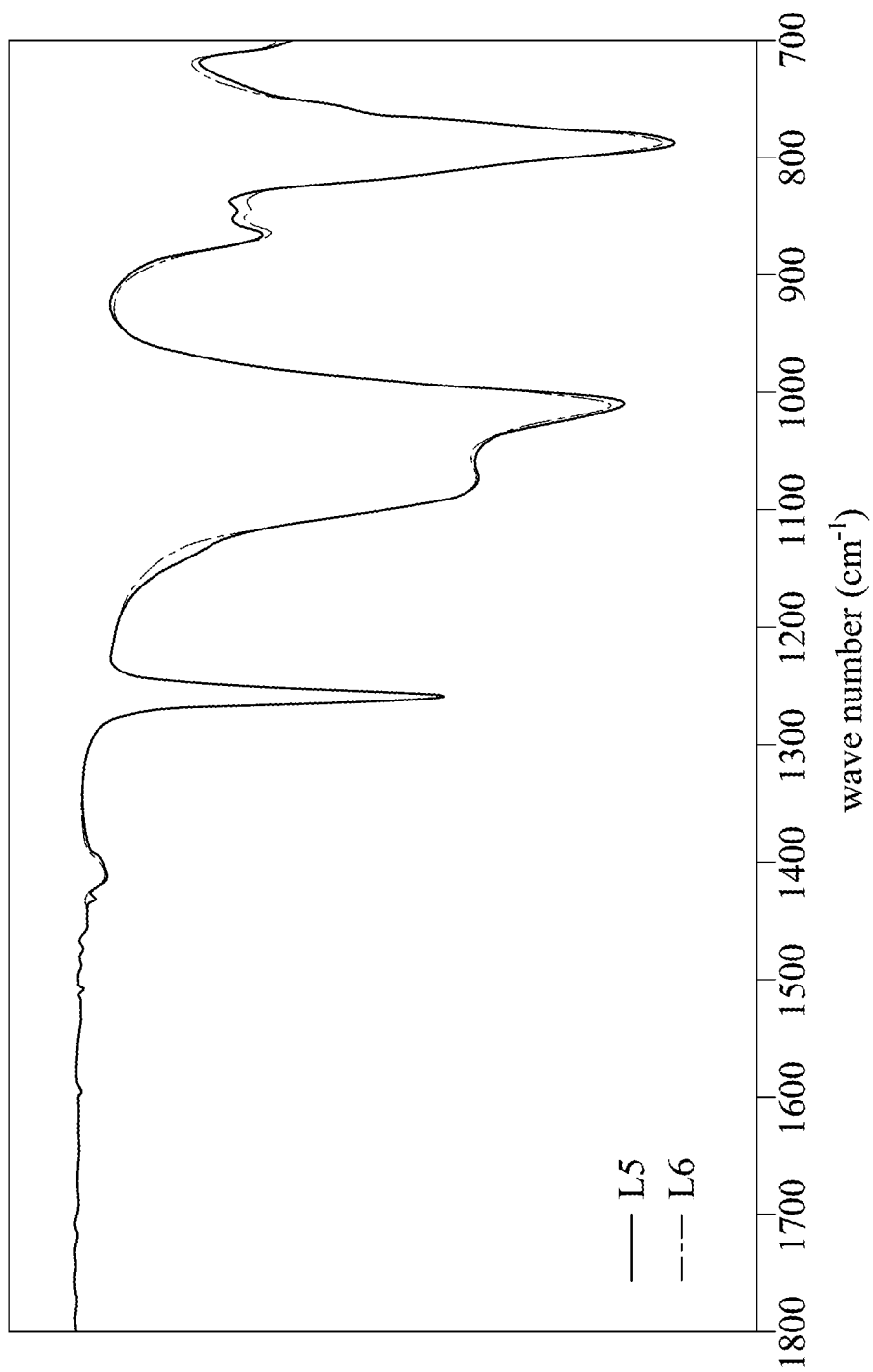
FIG. 4 illustrates Fourier-Transform Infrared spectra of the binder of the comparative embodiment before a reaction and the binder of the comparative embodiment after a reaction.

FIG. 3 illustrates Fourier-Transform Infrared spectra of the binder of this embodiment before a reaction and the binder of this embodiment after a reaction. FIG. 4 illustrates Fourier-Transform Infrared spectra of the binder of the comparative embodiment before a reaction and the binder of the comparative embodiment after a reaction. It should be noted that the term "before a reaction" referred to herein means "before the condensation reaction", and the term "after a reaction" referred to herein means "after the condensation reaction", in which the condensation reaction may be a dehydration or dealcoholization reaction. In FIG. 3, curve L3 is an absorption curve of the binder of this embodiment before the reaction, and curve L4 is an absorption curve of the binder of this embodiment after the reaction. In FIG. 4, curve L5 is an absorption curve of the binder of the comparative embodiment before the reaction, and curve L6 is an absorption curve of the binder of the comparative embodiment after the reaction.

Please first refer to FIG. 3. As shown by the curves L3 and L4, the characteristic absorption bandwidth of the Si—O—Si bonds in the binder of this embodiment is significantly broadened after the reaction. Accordingly, during reaction period, the compound monomers of the binder in this embodiment before the reaction participate in the network-crosslinking reaction of Si—O—Si bonding. Please then refer to FIG. 4. As shown by the curves L5 and L6, the characteristic absorption bandwidth of the Si—O—Si bond in the binder of the comparative embodiment has not changed significantly before and after the reaction. Accordingly, during reaction period, the compound monomers of the binder before the reaction do not participate in the network-crosslinking reaction of Si—O—Si bonding. In addition, as shown by the curves L4 and L6, a first area formed by the characteristic absorption curve of Si—O—Si in the binder of this embodiment is larger than a second area formed by the characteristic absorption curve of Si—O—Si in the binder of the comparative embodiment, in which [(the first area—the second area)/the first area] is between about 13% and about 15%. In other words, under a same reaction condition, a content of the binder of this embodiment after the reaction is about 13% to about 15% greater than that of the binder of the comparative embodiment after the reaction.

Figure 5:
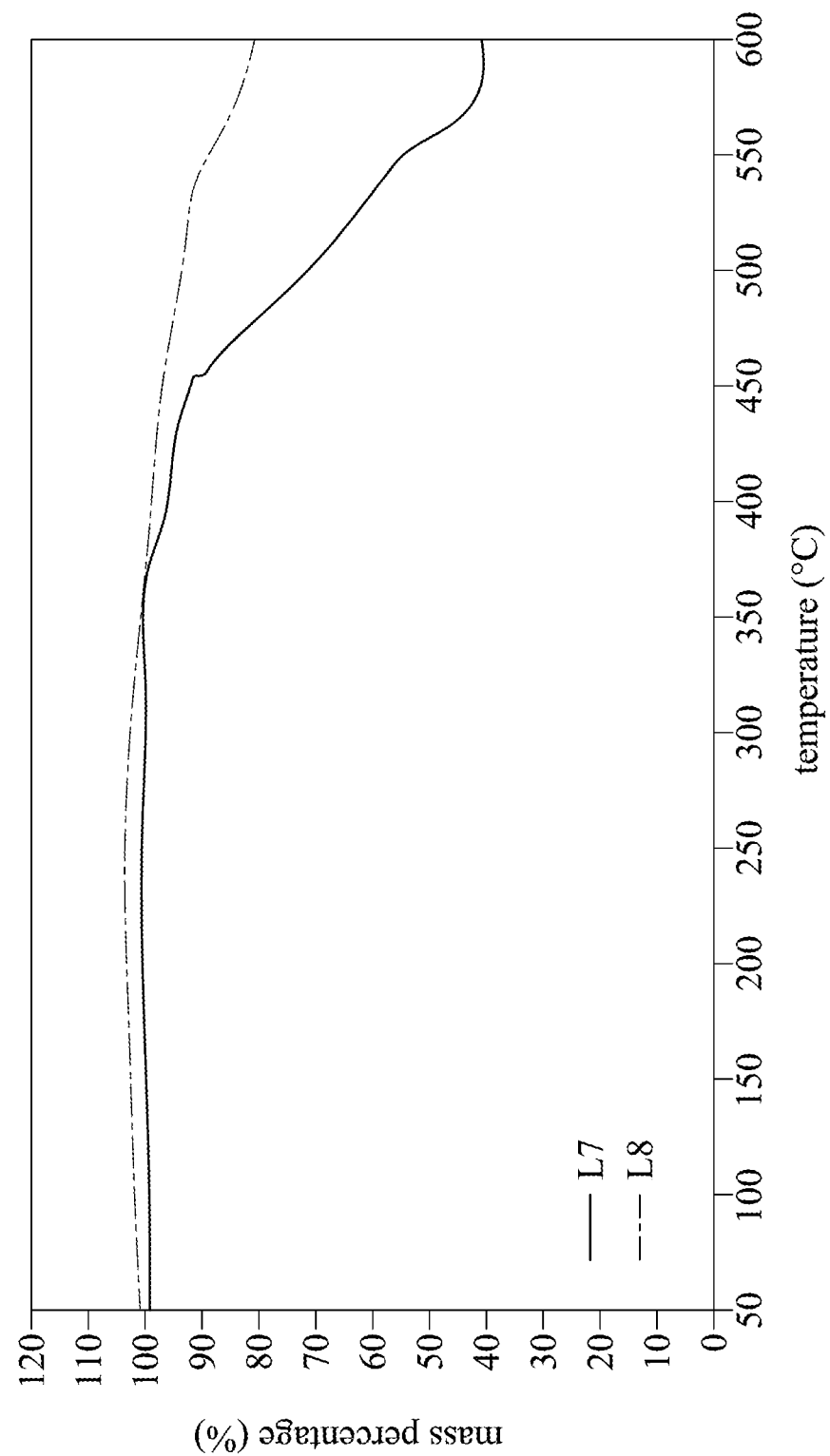
FIG. 5 illustrates a diagram of a relationship between a mass percentage and a temperature of the binder of this embodiment and the binder of the comparative embodiment.

FIG. 5 illustrates a diagram of a relationship between a mass percentage and a temperature of the binder of this embodiment and the binder of the comparative embodiment. FIG. 5 shows the result of the analysis of the binder of this embodiment and the binder of the comparative embodiment using thermogravimetric analysis (TGA). In FIG. 5, curve L7 is a mass versus temperature curve of the binder of the comparative embodiment, and curve L8 is a mass versus temperature curve of the binder of this embodiment. As shown by the curve L7, the mass of the binder of the comparative embodiment starts to decrease when the temperature rises to about 375° C., that is, the binder of the comparative embodiment starts to decay when the temperature rises to about 375° C. On the other hand, as shown by the curve L8, the mass of the binder of this embodiment starts to decrease when the temperature rises to about 550° C., that is, the binder of this embodiment starts to decay when the temperature rises to about 550° C. Accordingly, the binder of this embodiment has better heat resistance properties than the binder of the comparative embodiment.

Hereinafter, the features of the present disclosure will be described more specifically with reference to the wavelength converting devices of this embodiment 1, this embodiment 2, and the comparative embodiment 1. It should be noted that without exceeding the scope of the present disclosure, the materials used, quality and ratio, processing details, and processing procedures may be changed as appropriate. Therefore, the present disclosure should not be interpreted restrictively by the binder of this embodiment described below.

The Wavelength Converting Device of this Embodiment 1

In the wavelength converting device of this embodiment 1, the diffused-reflecting layer includes the binder of the aforementioned embodiment; the photoluminescence layer includes the binder of the aforementioned embodiment; the thickness of the diffused-reflecting layer is between 100 μm and 110 μm; the thickness of the photoluminescence layer is between 130 μm and 150 μm.

The Wavelength Converting Device of this Embodiment 2

In the wavelength converting device of this embodiment 2, the wavelength converting device of this embodiment 2 is manufactured by using components similar to those of the wavelength converting device of this embodiment 1, and the main differences are that the photoluminescence layer does not include the binder of the aforementioned embodiment, but include the binder of the aforementioned comparative embodiment instead.

The Wavelength Converting Device of the Comparative Embodiment 1

In the wavelength converting device of the comparative embodiment 1, the wavelength converting device the comparative embodiment 1 is manufactured by using components similar to those of the wavelength converting device of this embodiment 1, and the main differences are that the neither the diffused-reflecting layer nor the photoluminescence layer include the binder of the aforementioned embodiment, but include the binder of the aforementioned comparative embodiment instead.

Figure 6:
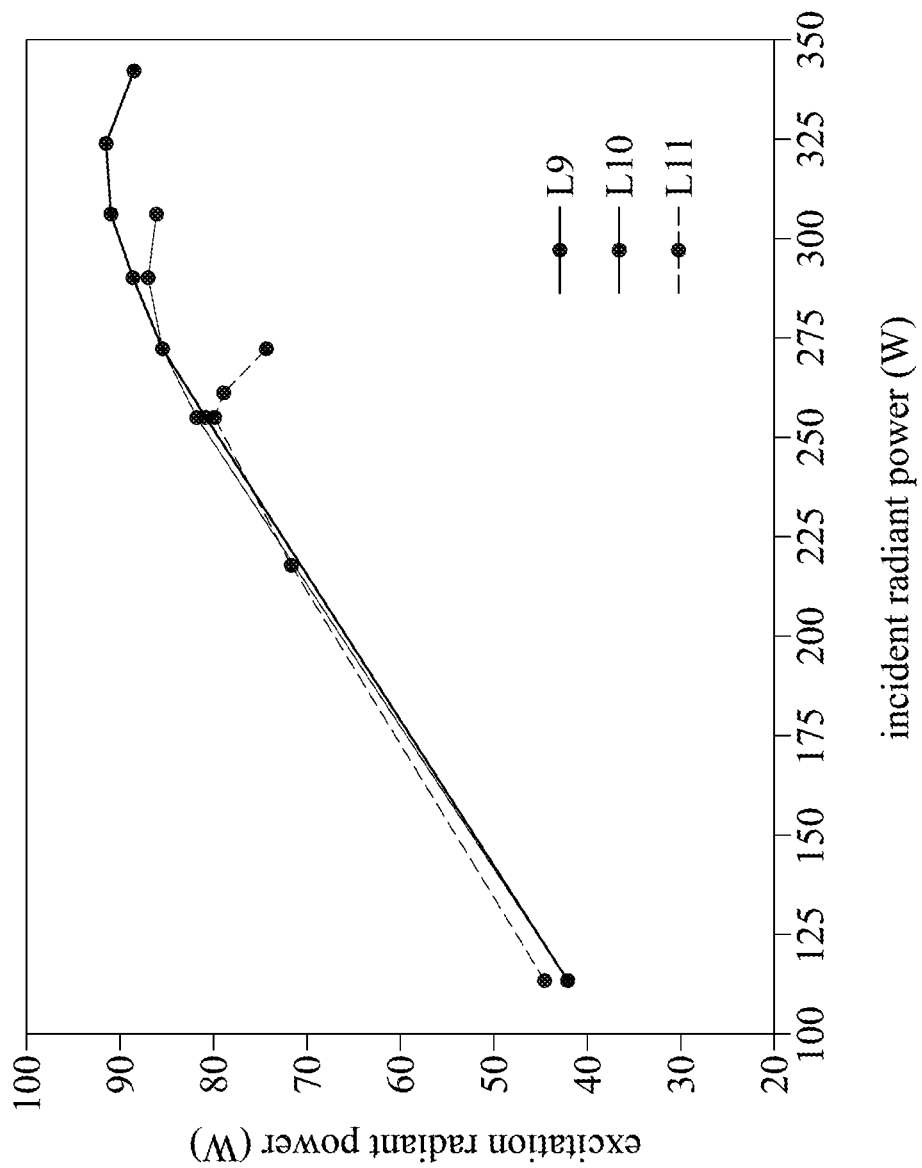
FIG. 6 illustrates a diagram of a relationship between an incident radiant power and an excitation radiant power of the wavelength converting device of this embodiment 1, the wavelength converting device of this embodiment 2, and the wavelength converting device of the comparative embodiment 1.

FIG. 6 illustrates a diagram of a relationship between an incident radiant power and an excitation radiant power of the wavelength converting device of this embodiment 1, the wavelength converting device of this embodiment 2, and the wavelength converting device of the comparative embodiment 1. In FIG. 6, curve L9 is a curve of the excitation radiant power versus the incident radiant power of the wavelength converting device of this embodiment 1, curve L10 is a curve of the excitation radiant power versus the incident radiant power of the wavelength converting device of this embodiment 2, and curve L11 is a curve of the excitation radiant power versus the incident radiant power of the wavelength converting device of comparative embodiment 1. As shown in FIG. 6, each of the curves L9, L10, and L11 has a turning point (i.e., the highest point of the curve), and when the incident radiant power exceeds this turning point, the materials in the wavelength converting device may suffer deterioration due to unbearability. In detail, the turning points of the curves L9, L10, and L11 respectively correspond to incident radiant power of about 325 W, 285 W, and 250 W. Accordingly, since the binder of the aforementioned embodiment has better optical resistances (i.e., able to withstand light beam irradiation with higher power), when both the diffused-reflecting layer and the photoluminescence layer include the binder of the aforementioned embodiment, the wavelength converting device can withstand a larger incident radiant power, thereby having a better optical quality.

According to the aforementioned embodiments of the present disclosure, since the binder of the wavelength converting device includes the structural unit represented by the above formula (1), and the characteristic absorption band in the Fourier-Transform Infrared Spectrum of Si—O—Si bonds in the binder is in a range from 900 cm$^{-1}$ to 1250 cm$^{-1}$, the diffused-reflecting layer and/or the photoluminescence layer mixed with the binder can have good optical resistance properties and heat resistance properties. In addition, since the binder includes a bulky aromatic group, the diffused-reflecting layer and/or the photoluminescence layer mixed with the binder can have a certain thickness to improve the overall optical quality of the wavelength converting device.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wavelength converting device, comprising:
   a diffused-reflecting layer having a first surface and a second surface facing away from each other;
   a substrate over the first surface of the diffused-reflecting layer;
   a photoluminescence layer over the second surface of the diffused-reflecting layer; and
   a binder being mixed at least in the photoluminescence layer or at least in the diffused-reflecting layer, wherein the binder comprises a structural unit represented by formula (1), and a characteristic absorption band in a Fourier-Transform Infrared (FTIR) Spectrum of silicon-oxygen-silicon bonds (Si—O—Si bonds) in the binder is from 900 cm$^{-1}$ to 1250 cm$^{-1}$,

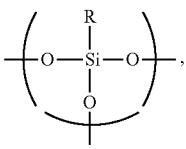

formula (1)

wherein R represents an aromatic group.

2. The wavelength converting device of claim 1, wherein the binder is mixed in the photoluminescence layer and the diffused-reflecting layer.

3. The wavelength converting device of claim 1, wherein the binder is mixed in the photoluminescence layer, and a viscosity of the photoluminescence layer comprising the binder at a temperature of 25° C. is between 200 mPa·s and 20000 mPa·s.

4. The wavelength converting device of claim 1, wherein the binder is mixed in the diffused-reflecting layer, and a viscosity of the photoluminescence layer comprising the binder at a temperature of 25° C. is between 200 mPa·s and 20000 mPa·s.

5. The wavelength converting device of claim 1, wherein a viscosity of the binder at a temperature of 25° C. is smaller than 300 mPa·s.

6. The wavelength converting device of claim 1, wherein the binder is mixed in the photoluminescence layer, and a thickness of the photoluminescence layer comprising the binder is between 50 μm to 200 μm.

7. The wavelength converting device of claim 1, wherein the binder is mixed in the diffused-reflecting layer, and a thickness of the diffused-reflecting layer comprising the binder is between 30 μm to 150 μm.

8. The wavelength converting device of claim 1, wherein the diffused-reflecting layer comprises a plurality of optical particles, and the optical particles comprise silicon dioxide, titanium dioxide, zinc oxide, boron nitride, zirconium dioxide, aluminum oxide, or combinations thereof.

9. The wavelength converting device of claim 8, wherein the photoluminescence layer comprises the optical particles.

* * * * *